United States Patent
Speer et al.

(10) Patent No.: US 8,927,622 B2
(45) Date of Patent: Jan. 6, 2015

(54) BIODEGRADABLE AND COMPOSTABLE COMPOSITION HAVING IMPROVED PHYSICAL AND CHEMICAL PROPERTIES

(75) Inventors: Drew V. Speer, Simpsonville, SC (US); Ronald L. Cotterman, Greenville, SC (US); Dwight W. Schwark, Simpsonville, SC (US); David A. Dellinger, Santa Barbara, CA (US)

(73) Assignee: Chamness Biodegradables, LLC, Carpinteria, CA (US)

( * ) Notice: Subject to any disclaimer, the term of this patent is extended or adjusted under 35 U.S.C. 154(b) by 214 days.

(21) Appl. No.: 12/168,049

(22) Filed: Jul. 3, 2008

(65) Prior Publication Data

US 2009/0012210 A1    Jan. 8, 2009

Related U.S. Application Data

(60) Provisional application No. 60/947,934, filed on Jul. 3, 2007.

(51) Int. Cl.
*C08K 5/098* (2006.01)
*C08L 91/00* (2006.01)
*A23L 1/0522* (2006.01)
*C08L 97/02* (2006.01)
*C08L 3/02* (2006.01)
*A23L 1/308* (2006.01)

(52) U.S. Cl.
CPC ............ *C08L 3/02* (2013.01); *C08L 2205/02* (2013.01); *A23L 1/0522* (2013.01); *C08L 97/02* (2013.01); *A23L 1/308* (2013.01); *C08L 2205/16* (2013.01)
USPC ............ 523/124; 524/9; 524/13; 524/15; 524/18; 524/19; 524/27; 524/35; 524/47; 524/400

(58) Field of Classification Search
CPC ... C08L 3/02; C08L 2205/02; C08L 2205/16; C08L 97/02; A23L 1/308; A23L 1/0522
USPC .......... 523/124; 524/9, 13, 15, 18, 19, 27, 35, 524/47, 400
See application file for complete search history.

(56) References Cited

U.S. PATENT DOCUMENTS

| | | | |
|---|---|---|---|
| 1,875,482 A | 9/1932 | Nanna | |
| 3,772,076 A | 11/1973 | Keim | |
| 4,545,752 A | 10/1985 | Hanamoto | |
| 4,639,341 A | 1/1987 | Hanamoto | |
| 4,900,242 A | 2/1990 | Maus et al. | |
| 5,100,586 A | 3/1992 | Jennings et al. | |
| 5,169,566 A | 12/1992 | Stucky et al. | |
| 5,205,863 A | 4/1993 | Elion | |
| 5,209,880 A | 5/1993 | Miwa | |
| 5,232,496 A | 8/1993 | Jennings et al. | |
| 5,352,111 A | 10/1994 | Selbak | |
| 5,354,621 A | 10/1994 | Liebermann | |
| 5,356,579 A | 10/1994 | Jennings et al. | |
| 5,358,676 A | 10/1994 | Jennings et al. | |
| 5,376,320 A | 12/1994 | Tiefenbacher et al. | |
| 5,385,764 A | 1/1995 | Andersen et al. | |
| 5,412,005 A | 5/1995 | Bastioli | |
| 5,453,310 A | 9/1995 | Andersen et al. | |
| 5,506,046 A | 4/1996 | Andersen et al. | |
| 5,508,072 A | 4/1996 | Andersen et al. | |
| 5,514,430 A | 5/1996 | Andersen et al. | |
| 5,523,293 A | 6/1996 | Jane et al. | |
| 5,527,387 A | 6/1996 | Andersen et al. | |
| 5,543,186 A | 8/1996 | Andersen et al. | |
| 5,545,297 A | 8/1996 | Andersen et al. | |
| 5,545,450 A | 8/1996 | Andersen et al. | |
| 5,549,859 A | 8/1996 | Andersen et al. | |
| 5,580,409 A | 12/1996 | Andersen et al. | |
| 5,580,624 A | 12/1996 | Andersen et al. | |
| 5,582,670 A | 12/1996 | Andersen et al. | |
| 5,614,307 A | 3/1997 | Andersen et al. | |
| 5,618,341 A | 4/1997 | Andersen et al. | |
| 5,626,954 A | 5/1997 | Andersen et al. | |
| 5,631,052 A | 5/1997 | Andersen et al. | |
| 5,631,053 A | 5/1997 | Andersen et al. | |

(Continued)

FOREIGN PATENT DOCUMENTS

| | | |
|---|---|---|
| EP | 0752209 A | 1/1997 |
| EP | 0880896 A | 10/1998 |

(Continued)

OTHER PUBLICATIONS

Hagenmaier et al.; "Wax microemulsions and citrus coatings," J. Agri Food Chem, 42, pp. 899-902 (1994).

(Continued)

*Primary Examiner* — Kriellion Sanders
(74) *Attorney, Agent, or Firm* — Perkins Coie LLP; Joseph P. Hamilton

(57) ABSTRACT

The present application is generally directed to novel compositions and methods used to produce a biodegradable, starch-based, water-resistant article of manufacture. The teachings include a composition comprising a biodegradable fiber component in an amount ranging from about 5% to about 40% on a dry weight basis, starch component in an amount ranging from about 40% to about 94.5% on a dry weight basis, and an additive component in an amount ranging from more than 0% to about 15% on a dry weight basis. The additive component can comprise an epoxidized vegetable oil, a hydrogenated triglyceride, poly(vinyl acetate), poly(vinyl acetate-ethylene) copolymer, poly(ethylene-vinyl acetate) copolymer, or a combination thereof.

53 Claims, No Drawings

(56) References Cited

U.S. PATENT DOCUMENTS

| | | |
|---|---|---|
| 5,631,097 A | 5/1997 | Andersen et al. |
| 5,635,292 A | 6/1997 | Jennings et al. |
| 5,637,412 A | 6/1997 | Jennings et al. |
| 5,641,584 A | 6/1997 | Andersen et al. |
| 5,654,048 A | 8/1997 | Andersen et al. |
| 5,658,603 A | 8/1997 | Andersen et al. |
| 5,658,624 A | 8/1997 | Andersen et al. |
| 5,660,900 A | 8/1997 | Andersen et al. |
| 5,660,903 A | 8/1997 | Andersen et al. |
| 5,660,904 A | 8/1997 | Andersen et al. |
| 5,662,731 A | 9/1997 | Andersen et al. |
| 5,665,152 A | 9/1997 | Bassi et al. |
| 5,665,439 A | 9/1997 | Andersen et al. |
| 5,665,442 A | 9/1997 | Andersen et al. |
| 5,676,905 A | 10/1997 | Andersen et al. |
| 5,679,145 A | 10/1997 | Andersen et al. |
| 5,679,381 A | 10/1997 | Andersen et al. |
| 5,683,772 A | 11/1997 | Andersen et al. |
| 5,691,014 A | 11/1997 | Andersen et al. |
| 5,693,355 A | 12/1997 | Haas |
| 5,695,811 A | 12/1997 | Andersen et al. |
| 5,702,787 A | 12/1997 | Andersen et al. |
| 5,705,203 A | 1/1998 | Andersen et al. |
| 5,705,237 A | 1/1998 | Andersen et al. |
| 5,705,238 A | 1/1998 | Andersen et al. |
| 5,705,239 A | 1/1998 | Andersen et al. |
| 5,705,242 A | 1/1998 | Andersen et al. |
| 5,707,474 A | 1/1998 | Andersen et al. |
| 5,709,827 A | 1/1998 | Andersen et al. |
| 5,709,913 A | 1/1998 | Andersen et al. |
| 5,711,908 A | 1/1998 | Tiefenbacher et al. |
| 5,714,217 A | 2/1998 | Andersen et al. |
| 5,716,675 A | 2/1998 | Andersen et al. |
| 5,720,913 A | 2/1998 | Andersen et al. |
| 5,736,209 A | 4/1998 | Andersen et al. |
| 5,738,921 A | 4/1998 | Andersen et al. |
| 5,753,308 A | 5/1998 | Andersen et al. |
| 5,766,525 A | 6/1998 | Andersen et al. |
| 5,776,388 A | 7/1998 | Andersen et al. |
| 5,783,126 A | 7/1998 | Andersen et al. |
| 5,783,240 A | 7/1998 | Wenger et al. |
| 5,786,080 A | 7/1998 | Andersen et al. |
| 5,798,151 A | 8/1998 | Andersen et al. |
| 5,800,647 A | 9/1998 | Andersen et al. |
| 5,800,756 A | 9/1998 | Andersen et al. |
| 5,810,961 A | 9/1998 | Andersen et al. |
| 5,830,305 A | 11/1998 | Andersen et al. |
| 5,830,548 A | 11/1998 | Andersen et al. |
| 5,843,544 A | 12/1998 | Andersen et al. |
| 5,851,634 A | 12/1998 | Andersen et al. |
| 5,868,824 A | 2/1999 | Andersen et al. |
| 5,922,379 A | 7/1999 | Wang |
| 5,928,741 A | 7/1999 | Andersen et al. |
| 5,973,082 A | 10/1999 | Elmore |
| 5,976,235 A | 11/1999 | Andersen et al. |
| 6,030,673 A | 2/2000 | Andersen et al. |
| 6,083,586 A | 7/2000 | Andersen et al. |
| 6,090,195 A | 7/2000 | Andersen et al. |
| 6,146,573 A | 11/2000 | Shogren et al. |
| 6,168,857 B1 | 1/2001 | Andersen et al. |
| 6,180,037 B1 | 1/2001 | Andersen et al. |
| 6,200,404 B1 | 3/2001 | Andersen et al. |
| 6,214,399 B1 | 4/2001 | Garbo |
| 6,220,849 B1 | 4/2001 | Atake |
| 6,228,898 B1 | 5/2001 | Nakanishi |
| 6,231,970 B1 | 5/2001 | Andersen et al. |
| 6,240,836 B1 | 6/2001 | Barbo |
| 6,277,899 B1 | 8/2001 | Bastioli |
| 6,347,934 B1 | 2/2002 | Andersen et al. |
| 6,350,461 B1 * | 2/2002 | Levy ........................ 424/409 |
| 6,379,446 B1 | 4/2002 | Andersen et al. |
| 6,413,069 B2 | 7/2002 | Oono |
| 6,461,549 B1 * | 10/2002 | Meeuwsen ................. 264/40.4 |
| 6,494,704 B1 | 12/2002 | Andersen et al. |
| 6,585,859 B1 | 7/2003 | Hakansson |
| 6,589,327 B1 | 7/2003 | Snidow |
| 6,846,573 B2 | 1/2005 | Seydel |
| 6,878,199 B2 | 4/2005 | Bowden et al. |
| 7,083,673 B2 | 8/2006 | Bowden et al. |
| 7,196,124 B2 | 3/2007 | Parker et al. |
| 2003/0047110 A1 | 3/2003 | Poovarodom et al. |
| 2003/0143417 A1 | 7/2003 | Kesselring et al. |
| 2003/0216492 A1 * | 11/2003 | Bowden et al. ............. 524/47 |
| 2004/0265453 A1 | 12/2004 | Helou et al. |
| 2005/0089606 A1 * | 4/2005 | Dellinger et al. ........... 426/106 |
| 2006/0057319 A1 | 3/2006 | Gleich et al. |
| 2006/0075544 A1 | 4/2006 | Kriesel et al. |
| 2006/0110498 A1 | 5/2006 | Dellinger |
| 2006/0229207 A1 | 10/2006 | Mentink et al. |
| 2006/0255507 A1 * | 11/2006 | Bowden et al. ........... 264/319 |
| 2007/0021534 A1 | 1/2007 | Glenn et al. |
| 2007/0234965 A1 * | 10/2007 | Aguilar et al. ............. 119/61.5 |
| 2007/0243346 A1 | 10/2007 | Kim |
| 2010/0311874 A1 | 12/2010 | Mentink et al. |

FOREIGN PATENT DOCUMENTS

| | | |
|---|---|---|
| JP | 08-081565 | 3/1996 |
| JP | 10-245792 | 9/1998 |
| JP | 11-222794 | 8/1999 |
| WO | 92/10938 A | 7/1992 |
| WO | 9723333 | 7/1997 |
| WO | 99/45073 A | 9/1999 |
| WO | 0039213 | 6/2000 |
| WO | 00/39215 A | 11/2003 |
| WO | 2005/021633 | 10/2005 |
| WO | 2006/102710 A1 | 10/2006 |

OTHER PUBLICATIONS

U.S. Patent and Trademark Office; International Search Report and Written Opinion for International Application No. PCT/US08/80979, mailed Dec. 24, 2008.

Japanese Patent Office, English translation of Dec. 8, 2009 Office Action for Japanese Patent Application No. 2006-524867.

Ducey et al, Alkaline Sizing Applications Surge Ahead, Alkaline Paper Advocate, Oct. 1, 1996.

European Patent Office, Supplemental Search Report for EP 04755659.2, Jul. 28, 2008.

Specialchem, Ethylene Vinyl Acetate (EVA) Product Description Web Page, http://www.specialchem4adhesives.com/tc/ethylene-co-polymers/index.aspx?id=eva, Jun. 21, 2007.

United States Patent and Trademark Office, International Search Report and Written Opinion for PCT/US04/19619, Nov. 27, 2006.

United States Patent and Trademark Office, International Search Report and Written Opinion for PCT/US04/27824, Aug. 29, 2008.

United States Patent and Trademark Office, International Search Report and Written Opinion for PCT/US06/42800, May 2, 2007.

United States Patent and Trademark Office, International Search Report and Written Opinion for PCT/US07/88989, Apr. 18, 2008.

United States Patent and Trademark Office, International Search Report and Written Opinion for PCT/US08/69266, Oct. 2, 2008.

European Patent Office, Supplementary European Search Report for EP Application 04782322, dated Jun. 10, 2009.

European Patent Office, Examination Report for EP Application 0478322.4, dated Sep. 23, 2009.

European Patent Office, Supplementary European Search Report for EP Application 06827369, dated Oct. 7, 2009.

United States Patent and Trademark Office, International Search Report and Written Opinion for PCT/US10/030124, mailed Jun. 4, 2011.

* cited by examiner

BIODEGRADABLE AND COMPOSTABLE COMPOSITION HAVING IMPROVED PHYSICAL AND CHEMICAL PROPERTIES

CROSS-REFERENCE TO RELATED APPLICATIONS

This application claims the benefit of U.S. Provisional Patent Application No. 60/947,934, filed Jul. 3, 2007, which is incorporated herein by reference.

BACKGROUND OF THE INVENTION

Description of Related Art

For millennia, the human population has been using packaging materials that were naturally returned to the environment to be reused over again. Materials that were not biodegradable were at least harmless to the environment, glass and metal being a good example. Today, plastic and paper pollution are reaching epidemic levels, polluting our oceans and quickly filling our available landfill capacities. The world is awakening to the unsustainability of creating materials that are usually used by the masses for 15 minutes, for example, but which commonly last for several hundred years.

Conventional disposable food service items are an example. They are commonly made from paper or paperboard (often coated or impregnated with a polymeric water-proofing material such as paraffin wax or polyethylene), or one of a variety of plastics (polystyrene is the most common). These materials have good to excellent resistance to moisture, can be insulating (e.g., foamed polystyrene or "Styrofoam"), and are inexpensive and durable. Methods used to produce disposable packaging from these materials are mature, allowing these items to be produced quickly and relatively cheaply in great quantities.

In addition, the current drive by many countries to reach industrial status has greatly reduced the free time that its working population has for preparing food at home or for creating specialty items. As the trend continues and even accelerates, the demand for throw away packaging is exploding. Moreover, there is a growing recognition that the environmental costs of using these "cheap" materials may be quite high, given the potential of using natural products that are biodegradable and/or compostable. The expected lifetime of a polystyrene cup, for example, can be up to 500 years, and each American disposes an average of about 100 of these cups per year. Further, polystyrene is made by chemical processing of benzene and ethylene, both byproducts of a petroleum industry that is recognized for its environmental problems. While governments around the world have all but given up on implementing recycling programs as unworkable and too costly, they still have the problem of garbage accumulation to solve and many have started taxing non-degradable packaging.

Natural products typically have short biodegradation times: banana peel (2-10 days), cotton rags (1-5 months), paper (2-5 months), rope (3-14 months), orange peel (6 months), wool socks (1-5 years). In contrast, as described above with regard to polystyrene cups, synthetic products have substantially longer biodegradation times: cigarette filters (1-12 years), plastic composite milk cartons (5 years), plastic bags (10-20 years), nylon fabric (30-40 years), plastic six-pack holder rings (450 years), diapers and sanitary pads (500-800 years). As such, the pressure to use biodegradable materials to assist with landfill and other environmental problems has been steadily increasing. Taiwan, for example, has recently outlawed the use of polystyrene foam in disposable packaging, and China has followed suit in its major cities (e.g., Beijing and Shanghai).

One method used to address environmental concerns about conventional disposable food container products has been the manufacture of starch-based disposable food service items such as trays, plates, and bowls. Starch-based packaging currently has several drawbacks, however, the most important being that the containers are susceptible to water. Cooked, unmodified starch is inherently water soluble. Because all of the starch-based biodegradable food service items currently being manufactured are formed in heated molds, much or all of the starch in these items is cooked, and the products thus formed are very sensitive to moisture. When exposed to water, other aqueous fluids, or significant amounts of water vapor, these items become very soft, losing form-stability and becoming susceptible to puncture by cutlery (e.g., knives and forks).

Manufacturers currently address the problem of the moisture-susceptibility of starch-based food-service items in two ways, either by not using the products in aqueous environments or by applying a coating to the product. As such, the product can be marketed for uses in which aqueous fluids or vapor are not present (e.g., dry or deep-fried items). This approach greatly limits the potential markets for these items, since many food products either (1) are aqueous (e.g., beverages, soups), (2) include an aqueous phase (e.g., meat, thin sauces, vegetables heated in water), (3) give off water vapor as they cool (e.g., rice and other starchy foods, hot sandwiches, etc.) or (4) transpire moisture (e.g., fresh produce). Moreover, biodegradable coatings can be costly to obtain and difficult to apply, thereby increasing manufacturing cost, complexity, and reducing the percentage of acceptable finished products.

One of skill will also appreciate a way to enhance the mechanical properties of the matrix material in starch-based food service articles, in order (a) to ease handling requirements during manufacture and (b) to enhance usability in dry environments. The mechanical properties of the matrix material, which is mainly starch, are critical to the performance of the starch-based food service articles. Baked, unmodified starch is typically quite fragile and brittle when dry, but relatively soft and pliable when the starch has equilibrated with air at moderate to high relative humidities. Fiber is often added to the formulation to increase the flexural strength and fracture energy of composites including starch-based items, especially during the period immediately after demolding, when the moisture content of the article is very low. Even with the addition of significant amounts (10% or more) of fiber, however, starch-based articles are commonly very brittle immediately after demolding or when stored for extended periods in dry environments (heated buildings in winter, air conditioned buildings in summer, desert environments any time of year) or when utilized in bakery applications. Structural failure of starch-based articles due to their brittleness continues to present problems during the manufacturing process (especially before coatings or laminated films are applied), during transportation, and any time the articles are used in dry environments.

One of skill will appreciate methods and formulations that incorporate fibrous materials from non-wood plants, and particularly from materials that are by products of commodities already in production. This is because the most commonly used fiber in starch-based food service articles is wood-pulp fiber (similar to the paper based articles). It is ready available, consistent in quality and material properties, and has the main properties needed to serve as structural elements in the finished food service articles. However, the use of slow-growing trees as a fiber source where many alternative agricultural byproduct sources are available is in itself questionable.

One of skill will appreciate a way to replace mineral fillers with fully biodegradable and renewable plant-based organic materials that serve the same role as traditional mineral fillers, and an even greater benefit exists if the filler material is currently produced as a byproduct of the production of another agricultural material. This is because inorganic mineral fillers, such as calcium carbonate, silica, calcium sulfate, calcium sulfate hydrate, magnesium silicate, micaceous minerals, clay minerals, titanium dioxide, etc., are often included in formulations used to produce starch-based biodegradable food service articles. Marketing claims made for products using these materials as fillers point out that the materials are natural, renewable, and environmentally benign but, unfortunately, these fillers are not biodegradable. And, there are additional environmental costs associated with the mining, synthesis, and/or processing of inorganic filler materials.

One of skill would appreciate a material that is compostable, as such materials are also beneficial in the reduction of waste. Compost can be used as a soil additive to greatly increase a soil's ability to retain moisture. For example, compost can be mixed with sandy soils to enhance organic stability and water retention, as well as bind heavy metals and other contaminates to reduce their leachability and absorption by plants. In addition, sites contaminated with various pollutants may often be improved by adding compost to the polluted soil. The microbes found in compost can also be used to degrade some toxic organic compounds, including the hydrocarbons in petroleum, which is a reason that compost is being used in bioremediation of petroleum contaminated soils.

One of skill will also appreciate a material that is edible, as these materials can be consumed by humans and animals, digested, disposed of like any other food material. These materials can be formed to have an appealing appearance, scent, taste, and texture such as, for example, breads, hamburger buns, hot dog buns, pizza crust, pie pans, ice cream cones, pet food packaging, and the like.

Accordingly, one of skill will appreciate compositions that can be used to produce earth-friendly, disposable rigid materials for the food and non-food consumer markets, particularly materials that are water-resistant, biodegradable, compostable, edible, have the desired physical properties, and are cheaper than paper and plastic, yet harmless to animals and children.

SUMMARY OF THE INVENTION

The teachings herein are generally directed to novel compositions and methods used to produce a biodegradable, starch-based, water-resistant article of manufacture. In some embodiments, the teachings are directed to a composition comprising a biodegradable fiber component in an amount ranging from about 5% to about 40% on a dry weight basis, starch component in an amount ranging from about 40% to about 94.5% on a dry weight basis, and an additive component in an amount ranging from more than 0% to about 15% on a dry weight basis. The additive component can comprise an epoxidized vegetable oil, a hydrogenated triglyceride, poly(vinyl acetate), poly(vinyl acetate-ethylene) copolymer, poly(ethylene-vinyl acetate) copolymer, or a combination thereof. In certain embodiments, the additive component may be present in an amount ranging from about 0.5% to about 10% on a dry weight basis.

In some embodiments, the biodegradable fiber component comprises a natural fiber, and the natural fiber can comprise a woody fiber, a non-woody fiber, or an animal fiber. In some embodiments, the biodegradable fiber component comprises a biodegradable synthetic fiber.

In some embodiments, the starch component can comprise an organic filler material having a ratio of starch to filler that ranges from about 10:1 to about 1:1, with the ratio of starch to filler typically having a value of about 3:1.

In some embodiments, the additive can be present in an amount ranging from about 2% to about 5%. In some embodiments, the additive component is a hydrogenated triglyceride, an epoxidized vegetable oil, or a polymer selected from the group consisting of poly(vinyl acetate), poly(vinyl acetate-ethylene) copolymer, and poly(ethylene-vinyl acetate) copolymer.

In some embodiments, the teachings are directed to an aqueous mixture comprising a composition taught herein, wherein the mixture can contain water in a quantity sufficient to allow for shaping of the composition into a form that creates a biodegradable, disposable, and water-resistant article of manufacture when heated at a sufficient temperature and for a sufficient time. In some embodiments, the amount of water ranges from about 40% to about 80%. In some embodiments, the starch component comprises a combination of native starch and pre-gelatinized starch, and the ratio of fiber to pre-gelatinized starch ranges from about 1.5:1 to about 3:1. The compositions can further comprise magnesium stearate, a wax, a cross-linking agent, or any combination thereof.

In some embodiments, the teachings are directed to a method of creating a biodegradable, starch-based, water-resistant article of manufacture. The method comprises adding an aqueous mixture comprising a composition taught herein to a mold apparatus having a cavity. The mixture is heated in the mold apparatus at a sufficient temperature and for a sufficient time for the mixture to be a stable form having a skin formed on the outer surface of the mixture where the mixture contacts the surface of the cavity during the heating. The mold apparatus comprises at least one gap such that vapor can exit the cavity of the mold though the gap without substantial loss of the mixture through the gap. And, in some embodiments, the material fills the mold cavity by in situ expansion during heating.

In some embodiments, the teachings are directed to an article of manufacture comprising the compositions taught herein, wherein the article of manufacture can be biodegradable and water-resistant and, in some embodiments, the article of manufacture can be compostable. In some embodiments, the article of manufacture can be a food service product, a packaging material, or a combination thereof. In some embodiments, the article of manufacture is an approved food product that is edible.

In some embodiments, the teachings are directed to a method of creating a biodegradable, starch-based, water-resistant article of manufacture. The method comprises preparing a mixture of a biodegradable fiber component and a starch component. The biodegradable fiber component can be in an amount ranging from about 5% to about 40% on a dry weight basis, and the starch component can be in an amount ranging from about 40% to about 94.5% on a dry weight basis. An additive component is added to the mixture in an amount ranging from about 0.5% to about 10% on a dry weight basis. And, the additive component can comprise a poly(vinyl acetate), poly(vinyl acetate-ethylene) copolymer, poly(ethylene-vinyl acetate) copolymer, or a combination thereof. An aqueous component is added to the mixture to create an aqueous composition, wherein the aqueous component comprises water in a quantity sufficient to allow for shaping of the composition into a desired form. The desired form is heated at a sufficient temperature and for a sufficient time to create a biodegradable, disposable, and water-resistant article of manufacture from the composition.

In some embodiments, the teachings are directed to a method of creating a biodegradable, starch-based, water-resistant article of manufacture having an improved strength. The method comprises preparing a mixture comprising a biodegradable fiber component and a starch component, wherein the biodegradable fiber component is in an amount ranging from about 5% to about 40% on a dry weight basis, and the starch component is in an amount ranging from about 40% to about 94.5% on a dry weight basis. An additive component is added to the mixture in an amount ranging from about 0.5% to about 10% on a dry weight basis, wherein the additive component comprises an epoxidized vegetable oil, poly(vinyl acetate), poly(vinyl acetate-ethylene) copolymer, poly(ethylene-vinyl acetate) copolymer, or a combination thereof. An aqueous component is added to the mixture to create an aqueous composition, wherein the aqueous component comprises water in a quantity sufficient to allow for shaping of the composition into a desired form. The desired form is heated at a sufficient temperature and for a sufficient time to create a biodegradable, disposable, and water-resistant article of manufacture from the composition.

In some embodiments, the teachings are directed to a composition comprising a biodegradable fiber component in an amount ranging from about 5% to about 40% on a dry weight basis, and a water-resistant starch component in an amount ranging from about 40% to about 94.5% on a dry weight basis. In such embodiments, the water-resistant starch can be, e.g., a chemically modified starch such as alkenyl succinic anhydride modified starch, acetic anhydride modified starch, vinyl acetate modified starch, acrolein modified starch, epichlorohydrin modified starch, phosphorus oxychloride modified starch, sodium trimetaphosphate modified starch, or propylene oxide modified starch, or the like; an unmodified starch such as high-amylose starch; or a combination thereof; or any other starch known in the art which has water-resistant properties. In some embodiments, the composition further comprises an additive component in an amount ranging from about 0.5% to about 10% on a dry weight basis, wherein the additive component comprises an epoxidized vegetable oil, a hydrogenated triglyceride, poly(vinyl acetate), poly(vinyl acetate-ethylene) copolymer, poly(ethylene-vinyl acetate) copolymer, or a combination thereof.

DETAILED DESCRIPTION OF THE INVENTION

The following description of the invention is intended to illustrate various embodiments of the invention. As such, the specific modifications discussed are not to be construed as limitations on the scope of the invention. It will be apparent to one skilled in the art that various equivalents, changes, and modifications may be made without departing from the scope of the invention, and it is understood that such equivalent embodiments are to be included herein.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list.

The compositions taught herein can be biodegradable, compostable, or a combination thereof, and can be used to produce articles that degrade in the same manner.

In some embodiments, a biodegradable material can decompose into simple compounds such as carbon dioxide, methane, water, inorganic compounds and biomass, where the predominant mechanism is the enzymatic action of microorganisms. In some embodiments, a biodegradable material can decompose rapidly by microorganisms under natural conditions, for example, under aerobic and/or anaerobic conditions. In some embodiments, a biodegradable material can be reduced to monomeric components when exposed to microbial, hydrolytic, and/or chemical actions. Under aerobic conditions, the biodegradation can transform the material into end-products that include carbon dioxide and water. Under anaerobic conditions, the biodegradation can transform the materials into end-products that include carbon dioxide, water, and methane. In some embodiments, biodegradation is referred to as mineralization.

In some embodiments, biodegradation can be distinguished from compostability in that a material that is biodegradable is simply degraded by biological activity, especially enzyme action, leading to significant change of chemical structure of material with no time limit. Compostability, on the other hand, can be a property of a biodegradable material. For a material to be compostable, in some embodiments, the material can be biodegraded in a compost system and completes its biodegradation during the end use of the compost. The criteria that identify useful compost include, for example, very low heavy metal content, no ecotoxicity, and no obvious distinguishable residues.

There are several tests available to determine whether a composition is biodegradable, compostable, or both biodegradable and compostable. The ASTM definition for compostability, for example, can be used in some embodiments. The ASTM definition states that a compostable material, for example, is a material that is "capable of undergoing biological decomposition in a compost site as part of an available program, such that the material is not visually distinguishable and breaks down into carbon dioxide, water, inorganic compounds, and biomass at a rate consistent with known compostable materials". In some embodiments, compostability can be measured per ASTM D-5338 using the Tier Two Level testing per ASTM D 6400. In comparison, the European definition of compostable material, for example, is a material that can break down by about 90% within about 6 months on a home or industrial compost heap, and materials that meet this criteria can be marked as "compostable" under European Standard EN 13432 (2000).

Biodegradation tests vary in the specific testing conditions, assessment methods, and criteria desired. As such, there is a reasonable amount of convergence between different protocols leading to similar conclusions for most materials. For aerobic biodegradability, for example, the American Society for Testing and Materials (ASTM) has established ASTM D 5338-92. ASTM D 5338-92 measures the percent of test material that mineralizes as a function of time. The test monitors the amount of carbon dioxide being released as a result of assimilation by microorganisms in the presence of active compost held at a thermophilic temperature of 58° C. Carbon dioxide production testing may be conducted using electrolytic respirometry. Other standard protocols, such 301B from the Organization for Economic Cooperation and Development (OECD), may also be used. In some embodiments, a material is biodegradable if it has degraded by 60% or more in 28 days. See OECD 301D "closed bottle test" (Organization for Economic Cooperation and Development, France). Standard biodegradation tests in the absence of oxygen are described in various protocols such as ASTM D 5511-94. These tests could be used to simulate the biodegradability of materials in an anaerobic solid-waste treatment facility or sanitary landfill.

The Biodegradable Products Institute (BPI) and US Composting Council (USCC) use American Society for Testing and Materials Specifications (ASTM) to approve products for their "Compostable Logo." These specifications are used to identify plastic and paper products which disintegrate and biodegrade completely and safely when composted in a municipal or commercial facility, like kraft paper, yard trimmings and food scraps. The "Compostable Logo" is awarded to any products meeting ASTM D6400 or D6868, based on testing in approved independent laboratories. The BPI certification, for example, demonstrates that a material meets the specifications in ASTM D6868 and will biodegrade swiftly and safely during municipal, commercial, or household composting.

For example, ASTM has developed test methods and specifications for compostability that measure three characteristics: biodegradability, disintegration, and lack of ecotoxicity. To meet the biodegradability criteria for compostability, the material achieves at least about 60% conversion to carbon dioxide within 40 days and, as a measure of disintegration, less than 10% of the test material remains on a 2 millimeter screen in the actual shape and thickness that would exist in the disposed product. To determine the lack of ecotoxicity, the biodegradation byproducts must not exhibit a negative impact on seed germination and plant growth, which can be measured using the test detailed in OECD 208. See, for example, http://www.oecd.org/dataoecd/11/31/33653757.pdf. The International Biodegradable Products Institute will issue a logo for compostability, for example, once a product is verified to meet ASTM 6400-99 specifications. The protocol follows Germany's DIN 54900 which determines the maximum thickness of any material that allows complete decomposition within one composting cycle.

In some embodiments, the materials can biodegrade completely in less than 60 days, less than 50 days, less than 40 days, less than 30 days, less than 20 days, less than 10 days, or any range therein. In some embodiments, the materials can biodegrade up to 75%, up to 80%, up to 85%, up to 90%, up to 95%, up to 98%, up to 99%, or any range therein, in less than 30 days, less than 28 days, less than 25 days, less than 20 days, or any range therein. In some embodiments, the products produced from the compositions taught herein meet the specifications in ASTM D6868 for biodegradability.

In certain embodiments, the teachings herein are directed to a composition comprising a biodegradable fiber component in an amount ranging from about 5% to about 40% on a dry weight basis, preferably about 15% to about 30%; a starch component in an amount ranging from about 40% to about 94.5% on a dry weight basis, preferably about 45% to about 75%; and one or more additive components in an amount ranging from more than 0% to about 15% on a dry weight basis, preferably about 0.5% to about 10%. In certain embodiments, the additive components may be present in an amount ranging from about 1.5% to about 7% on a dry weight basis. In certain embodiments, the additive components may be present in an amount ranging from about 2% to about 5% on a dry weight basis.

The biodegradable fiber component can comprise a natural fiber, and the natural fiber can comprise a woody fiber, a non-woody fiber, or an animal fiber such as wool. Woody fibers can come from trees, for example, and are the principal source of cellulosic fiber. Non-woody fibers include, but are not limited to, bagasse, bamboo, and straw. Examples of natural fibers can include, but are not limited to wool, cotton, wood pulp fibers, bamboo, kenaf, flax, jute, hemp, abaca, grass, reeds, and the like. The fiber component can also include mixtures of any of the fibers taught herein.

Any biodegradable synthetic fiber known to one of skill may be used in some embodiments of the present invention. Examples of such synthetic fibers can include, but are not limited to, polyolefin, polyester, polyamide, acrylic, rayon, cellulose acetate, poly(lactide), poly(hydroxy alkanoates), thermoplastic multicomponent fibers (such as conventional sheath/core fibers, for example polyethylene sheath/polyester core fibers) and the like and mixtures thereof. In many embodiments, the synthetic fibers will be partially or completely biodegradable as defined in ASTM D 6400.

Several natural fibrous materials may be used in combination both as structural elements (at several size scales) in the baked items and or as inexpensive organic fillers. Fiber elements are used both to control the molding characteristics of the wet batter and to enhance the structural stability of the finished food service and packaging articles. Although there is a continuum of fiber lengths and fiber aspect ratios that can potentially be used in the formulation, the fibrous portion of the formulation can be in a general sense separated into three classes (based on fiber length) that serve different functions: long or very long (4 to 25 mm or longer) fibers or composite fiber elements are used to form a mesh of fibers that can help to prevent defects from forming in the batter as it expands in the mold; medium-length fibers (0.5 to 5 mm) can also help control the flow characteristics of the wet batter and serve to increase the toughness of the finished food service articles, preventing fracture during handling and during normal use; short fibers (<0.5 mm) serve mainly as a way to introduce readily biodegradable material into the formulation. In general, longer fibers have higher aspect ratios than short fibers, since there is generally greater variation in fiber length than fiber diameter. Average aspect ratios for long or very long fibers can range from about 40:1 to more than 1,000:1. Medium-length fibers can have average aspect ratios ranging from about 5:1 to about 200:1. For short fibers, aspect ratios are typically less than about 50:1. Some filler material, for example, can be more water-resistant than the starch-based matrix that contains them. (Several types of fiber provide this functionality, but the presence of the medium, long, and very long fibers are required for the molding, handling and usage characteristics they provide, whereas the short fiber elements may be, in some embodiments, present primarily for their contribution to water-resistance.)

Fibers from several sources can be included in many of the compositions taught herein. Relatively high quality fibers from grass or reed species provide mid-length fibers that can contribute to structural stability and resilience in the finished articles. Long to very long fibers, or fiber composites, may come from lightly processed agricultural byproducts, such as stalk or husk materials that have been chopped, ground, or milled to an appropriate size. Under appropriate processing conditions such as, for example, hammer or knife milling, these materials can provide a considerable amount of the very short fiber that can replace some of the starch in some embodiments, as well as add water resistance to the finished article. In addition, the fibrous material in the form of ground wood, e.g., wood flour; ground cellulose, e.g., ground bamboo pulp; ground nut shells (or other very hard, lignin-rich plant materials); or any combination thereof, may also serve as organic, relatively water resistant, biodegradable filler used to replace conventional inorganic filler materials.

Some fibers can be obtained from fast-growing plants, such as grasses or reeds that include, but are not limited to, kenaf and bamboo. Some fibers are also widely available as a by-product of agricultural production—stalks, stems, and husks from cereal grains, for example, are a ready source of medium length fiber.

The fibrous materials can vary greatly in fiber length and fiber aspect ratio. In some embodiments, the materials can have an average fiber length that is less than about 2 mm and an average aspect ratio that is in the range of about 1.1:1 to 250:1, about 1.3:1 to 125:1, about 1.4:1 to 70:1, or about 1.5:1 to 30:1.

There are several sources available for the starch component. Sources of starch may include, but are not limited to, plant sources such as tubers, roots, seeds, and or fruits of plants, and specific plants sources may include corn, potato, tapioca, rice, or wheat or similar, or animal sources, namely glycogen. In some embodiments, starch is a combination of both pregelatinized and uncooked or native starches. In some embodiments, the pregelatinized starch has a concentration in the range of about 0% to about 30% by weight of total starch in the formulation, or more than 0% to about 30% by weight of total starch in the formulation, and more preferably 3% to 20%, and most preferably 5% to 15%. Food-grade starches (pregelatinized or uncooked) that have been modified by cross-linking, stabilization, or addition of lipophilic functional groups may be included to increase resistance of the products to softening when exposed to aqueous foods.

In some embodiments, the starch can be a water-resistant starch, for example, a modified starch, which may be, for example, a chemically modified starch such as alkenyl succinic anhydride modified starch, acetic anhydride modified starch, vinyl acetate modified starch, acrolein modified starch, epichlorohydrin modified starch, phosphorus oxychloride modified starch, sodium trimetaphosphate modified starch, or propylene oxide modified starch, or the like; an unmodified starch such as high-amylose starch; or a combination thereof; or any other starch known in the art which has water-resistant properties. In some embodiments, the starch component can include a high-amylose starch. For example, the starch component can comprise natural starch, pre-gelatinized starch, high-amylose starch, or a combination thereof. In some embodiments, at least a portion of the starch component can be comprised of one or more water-resistant starches. The water-resistant starches may either be standard starches that have been chemically modified to be water resistant, such as, e.g., alkenyl succinic anhydride modified starch, acetic anhydride modified starch, vinyl acetate modified starch, acrolein modified starch, epichlorohydrin modified starch, phosphorus oxychloride modified starch, sodium trimetaphosphate modified starch, or propylene oxide modified starch, or the like, or high amylose starches that are water resistant in their native, unmodified state; or a combination thereof; or any other starch known in the art which has water-resistant properties. In these embodiments, the water-resistant fraction of the starch component may include chemically modified water-resistant starch, naturally water resistant high-amylose starch, or a combination thereof. Use of water-resistant starches as a portion of the starch component increases the moisture resistance of the finished products.

In some embodiments, the starch component comprises an organic filler material having a ratio of starch to filler that ranges from about 10:1 to about 1:1. In some embodiments, the starch component can include a filler material, most often an organic filler, with the ratio of starch to filler typically having a value of about 3:1.

In many embodiments, the filler is organic. The organic filler material may include, for example, ground nut shells such as walnut shells; ground wood, e.g., wood flour; ground cellulose, e.g., ground bamboo pulp; or any combination thereof. The organic filler material can result in fibrous matter that includes short or very short fibers, and they may be used alone as the filler material or be combined with other filler materials. In some embodiments, the concentration of organic filler material in the compositions is more than 0% to about 30% by dry weight, or about 5% to about 30% by dry weight. The organic filler materials may be used alone as the filler material or in combination with other filler materials. In some embodiments, the concentration of organic filler material can be about 10% to 25%, or about 15% to 21% of the dry weight of the product.

In some embodiments, short fibers may be used in conjunction with, or replaced by other filler materials imparting the same advantages as the shorter fibers. For example, such filler materials may include both organic and inorganic aggregates such as calcium carbonate, silica, calcium sulfate, calcium sulfate hydrate, magnesium silicate, micaceous minerals, clay minerals, titanium dioxide, talc, etc. The concentration of aggregate and/or short fibers may be in a range of about 0% to about 30%, about 2.5% to about 25%, about 5% to about 20%, about 5% to about 25% or about 7% to about 21% of the dry weight of the formulation.

The additive component can add water resistance, strength, or a combination of water resistance and strength to an article of manufacture produced from a biodegradable, starch-based, composition. In some embodiments, the additive component comprises an epoxidized vegetable oil, a hydrogenated triglyceride, poly(vinyl acetate), poly(vinyl acetate-ethylene) copolymer, poly(ethylene-vinyl acetate) copolymer, or a combination thereof. In some embodiments, the additive is present in an amount ranging from about 2% to about 5%.

In certain embodiments, the additive component comprises epoxidized triglycerides. Although traditionally used as plasticizers, particularly for PVC and PVDC (polyvinyl chloride and polyvinylidene dichloride), epoxidized vegetable oils in the starch based composite surprisingly allows for a broader density range of articles of manufacture that can be produced using a heated mold process. Surprisingly, the manufacture of denser articles does not require a longer heating time when epoxidized oils are used. Further, denser articles are stronger and may be more economical to produce than thicker articles, which ordinarily require longer heating times. Epoxidized triglycerides can be obtained by the epoxidation of triglycerides of unsaturated fatty acids from animal or vegetable sources. Examples of suitable epoxidized vegetable oils are epoxidized linseed oil, epoxidized soybean oil, epoxidized corn oil, epoxidized cottonseed oil, epoxidized perilla oil, epoxidized safflower oil, and the like. In some embodiments, the epoxidized vegetable oils can include epoxidized linseed oil (ELO) and epoxidized soybean oil (ESO). To meet FDA requirements for food contact, ELO typically needs an iodine number of less than about 5 and a minimum oxirane oxygen content of about 9%, and ESO will typically have an iodine number of less than about 6 and a minimum oxirane oxygen content of about 6%.

A variety of epoxidized vegetable oils can be used. In some embodiments, the epoxidized vegetable oils have an epoxide equivalent weight of about 400 to about 475. Partially epoxidized vegetable oils may be used in some embodiments. In some embodiments, the epoxidized vegetable oils used in this invention have an epoxide equivalent weight of less than about 225. For example, epoxidized linseed oil having an epoxide equivalent weight of 178 can be reacted with a monocarboxylic acid or a monohydric phenol to raise the equivalent weight to 400-475.

The additive component comprises a hydrogenated triglyceride in some embodiments. Starch-based biodegradable compositions can uses waxes, such as carnauba wax, candelilla wax, paraffin wax, montan wax, polyethylene wax, and the like to increase water resistance. Carnauba wax, for example, is quite expensive and its use is limited to no more than about 3% on a dry wt. basis because it can steam distill out during molding and plug the vents in the molding apparatus used to form an article of manufacture from the composition. In some embodiments, hydrogenated vegetable oil with a melting point of between about 54° C. and 85° C. can be used in place of the wax to improve the moisture resistance of the formulation. Suitable hydrogenated triglycerides can be prepared from animal or vegetable fats and oils such as tallow, lard, peanut oil, soybean oil, canola oil, corn oil and the like. Suitable hydrogenated vegetable oils include those available from EvCo Research under the trade names EVCOPEL EVCORR™, and EVCOPEL EVCEAL™. In some embodiments, the hydrogenated triglycerides are used in concentrations of up to 5%. The hydrogenated triglyceride can be added to the formulation in the form of a solid powder, melt, or as an emulsion.

The additive component can be a polymer. In some embodiments, the additive component is a polymer selected from the group consisting of poly(vinyl acetate) (PVA), poly(vinyl acetate-ethylene) (VAE) copolymer, and poly(ethylene-vinyl acetate) (EVA) copolymer. When added to the starch based composite, PVA, VAE, and EVA increase the moisture resistance of the compositions. EVA is a copolymer of ethylene and vinyl acetate with less than 50 wt. % vinyl acetate; whereas, VAE is a copolymer of ethylene and vinyl acetate with more than 50 wt. % vinyl acetate. EVA's are typically semi crystalline copolymers with melting points between about 60° C. and 110° C. and glass transition temperatures ($T_g$) similar to polyethylene. VAE's, on the other hand, are typically amorphous polymers (no defined melting point) with $T_g$'s in the range of about −20° C. to about 30° C. To facilitate addition to an aqueous formulation the polymers will preferably used in the form of emulsions or latices.

The composition can be in the form of an aqueous mixture, wherein the mixture contains water in a quantity sufficient to allow for shaping of the composition into a form that creates a biodegradable, disposable, and water-resistant article of manufacture when heated at a sufficient temperature and for a sufficient time. One of skill in the art will appreciate that there are a variety of processes available for shaping an article of manufacture, for example, molding, injection molding, expansion molding, pressing, stamping, and the like, where each of the available processes will vary according the water content, or consistency, of the composition that is needed for such processing. In some embodiments, the aqueous mixture can have from about 40% to about 80% water by weight, from about 45% to about 75% water, from about 50% to about 70% water, from about 55% to about 65% water, or any range therein. Further, one skilled in the art will recognize that, in some embodiments, the mixtures can be water-based, partially water-based, and potentially organic solvent-based. For example, such mixtures could be alcohol-based mixtures or other non-water-based mixtures.

In some embodiments, the starch component of an aqueous mixture can comprise a combination of native starch and pre-gelatinized starch. The ratio of the fiber to pre-gelatinized starch can range, for example, from about 1.5:1 to about 3:1, from about 1:1 to about 4:1, from about 2:1 to about 5:1, or any range therein.

In some embodiments, the aqueous mixture can further comprise magnesium stearate, a wax, a cross-linking agent, or a combination thereof. The magnesium stearate is a mold-release agent that also provides some water resistance. A mold release agent, or abherent, is provided to reduce adhesion between baked parts and the mold system. Other mold-release agents can be used including, but not limited to, metal stearate compounds in general, such as aluminum, magnesium, calcium, potassium, sodium, or zinc stearates; fatty acids, such as oleic acid, linoleic acid, etc.; fats; oils; and any combination thereof.

Any of a variety of waxes may be suitable in some embodiments. Examples of waxes include carnauba, candelilla, rice bran, paraffin, or any other food-grade wax. In some embodiments, vegetable waxes may perform better than animal or mineral waxes. In some embodiments, natural waxes may perform better than synthetic varieties. Wax emulsions can be prepared using emulsifying agents and mechanical agitation. Examples of wax emulsions suitable for use in the present formulation include emulsified carnauba wax and emulsified candelilla wax. Emulsifiers include all of those permitted for food applications including, but not limited to, sorbitan monostearate, polysorbate 60, polysorbate 65, polysorbate 80, sodium and potassium stearate, food-grade gums (e.g., arabinogalactan, carrageenan, furcelleran, xanthan), stearyl monoglyceridyl citrate, succistearin, hydroxylated lecithin, and many other like compounds.

Any of a variety of cross-linking agents can be used to cross-link the starch and fiber in some embodiments. The cross-linking agents include, but are not limited to, methylamine compounds, polyvalent (multivalent) acids, polyvalent acid halogenides, polyvalent acid anhydrides, polyaldehydes, polyepoxides, polyisocyanates, 1,4 butanediol diglycidylether, epichlorohydrin resins, glyoxal, ammonium zirconium carbonate, potassium zirconium carbonate, polyamide-epichlorohydrin resin, polyamine-epichlorohydrin resin, and the like.

Other ingredients that can be included in the composition are proteins and natural compounds, natural rubber latex, and fiber sizing agents. Fiber sizing agents include for example, rosin, rosin esters, rosin soaps, alkylketene dimmers (AKD), and alkenyl succinic anhydrides (ASA). Such other ingredients may include, but are not limited to preparations made from casein, soy protein isolate or concentrate, or similar such preparations. One such preparation can be prepared in the following three steps:

1) cooking a solution of casein or soy protein isolate in water (about 10% by weight) as per usual manufacturer's recommendations (generally, hydrating the protein by soaking, then gradually raising the temperature and pH of the solution to 180° F. and pH=9 to 9.5, then holding the solution at 180° F. for 15 minutes);

2) cooling the preparation to room temperature; and optionally, 3) adding a preservative and blending thoroughly. The preferred concentration of preservative in the preparation is about 0.1% or less, depending on the shelf life required for the protein solution, the concentration of protein required in the final product, and the limits imposed by government regulations on the dosages of preservative compounds in edible materials.

Other proteins may also be used in combination with the casein or soy protein preparation or separately to improve the water-resistant properties of the containers. For example, such proteins may include albumen, gelatin, and the like.

In some embodiments, the invention includes a method of creating a biodegradable, starch-based, water-resistant article of manufacture. The method comprises adding a composition taught herein to a mold apparatus having a cavity. The composition can be an aqueous mixture that is heated in the mold apparatus at a sufficient temperature and for a sufficient time for the mixture to be a stable form having a skin formed on the outer surface of the mixture where the mixture contacts the surface of the cavity during the heating. The mold apparatus comprises at least one gap so that the vapor can exit the cavity of the mold though the gap without substantial loss of the mixture through the gap.

In some embodiments, the invention includes producing an article of manufacture using a composition taught herein, wherein the article of manufacture is biodegradable and water-resistant. One of skill will appreciate that the compositions taught herein can produce materials having an almost endless array of uses. In some embodiments, the products can be used in the food industry. The food industry products can include, but are not limited to, single-compartment and multi-compartment trays, bowls, cold cups, hot cups with lids, plates, baking pans, muffin trays, and restaurant take-out containers with lids. In some embodiments, materials can be used to produce general packaging products, such as for electronic product packaging, battery packaging, and the like. In many embodiments, the materials can be used to produce products that can be filled, frozen, shipped, baked, microwaved, served, and even consumed. In some embodiments, the products are fully microwavable, ovenable, insulating, and/or are harmless if eaten. In some embodiments, the products can be scented and flavored. In some embodiments, the article of manufacture is compostable. In some embodiments, the article of manufacture is an approved food product that is edible.

In some embodiments, the invention includes a method of creating a biodegradable, starch-based, water-resistant article of manufacture. The method comprises preparing a mixture of a biodegradable fiber component and a starch component. The biodegradable fiber component is in an amount ranging from about 5% to about 40% on a dry weight basis, and the starch component is in an amount ranging from about 40% to about 94.5% on a dry weight basis. An additive component is added to the mixture in an amount ranging from about 0.5% to about 10% on a dry weight basis. The additive component can comprise a hydrogenated triglyceride, poly(vinyl acetate), poly(vinyl acetate-ethylene) copolymer, poly(ethylene-vinyl acetate) copolymer, or any combination thereof. An aqueous component is added to the mixture to create an aqueous composition, wherein the aqueous component comprises water in a quantity sufficient to allow for shaping of the composition into a desired form.

Other additives can be added as part of the aqueous component, such as salts, buffers, coloring agents, vitamins, nutrients, pharmaceuticals, nutraceuticals, organic filler materials, and the like. The desired form is then heated at a sufficient temperature and for a sufficient time to create a biodegradable, disposable, and water-resistant article of manufacture from the composition.

In some embodiments, the invention includes a method of creating a biodegradable, starch-based, water-resistant article of manufacture having an improved strength. The method comprises preparing a mixture comprising a biodegradable fiber component and a starch component, wherein the biodegradable fiber component is in an amount ranging from about 5% to about 40% on a dry weight basis, and the starch component is in an amount ranging from about 40% to about 94.5% on a dry weight basis. An additive component is added to the mixture in an amount ranging from about 0.5% to about 10% on a dry weight basis. The additive component comprises an epoxidized triglyceride, poly(vinyl acetate), poly(vinyl acetate-ethylene) copolymer, poly(ethylene-vinyl acetate) copolymer, or a combination thereof. An aqueous component is added to the mixture to create an aqueous composition, wherein the aqueous component comprises water in a quantity sufficient to allow for shaping of the composition into a desired form. The desired form is heated at a sufficient temperature and for a sufficient time to create a biodegradable, disposable, and water-resistant article of manufacture from the composition.

Example 1

Preparing a Composition

Table 1 provides components and compositions ranges that are useful in some embodiments of the present invention.

TABLE 1

| Material | Range (Wt. % wet basis) | Preferred Range (Wt. % wet basis) |
| --- | --- | --- |
| Water | 40-80 | 55-65 |
| Fiber | 2-16* | 6-12* |
| Filler | 2-16* | 4-12* |
| Native starch | 8-30* | 14-25* |
| Pre-gel starch | 1-10* | 2-6* |
| Magnesium stearate | 0-4* | 0.4-2* |
| Wax | 0-3* | 0.4-1.2* |
| Crosslinker | 0-2* | 0.2-0.6* |
| Epoxidized veg. oil | 0-3.2* | 0.2-2.4* |
| PVAc, VAE etc. | 0-4* | 0.8-2.5* |

*Note:
Divide by 0.4 to get the value for dry weight basis

At least one of the materials, magnesium stearate, epoxidized vegetable oil, or wax (including hydrogenated triglyceride), should be used, and, in some embodiments, that amount used is in the range of about 1.0-3.5 percent on a wet weight basis. In some embodiments, the ratio of total starch to filler should be about 3:1. The ratio of fiber to pre-gelatinized starch ranges from about 1.5:1 to 3:1 and, in some embodiments, is about 1.9:1 to 2.5:1. Optional ingredients include protein, natural rubber latex, coloring agents, and fiber sizing agents.

Example 2

Preparing a Article from the Composition

Articles were produced from the aqueous composition using a vented, heated mold apparatus. Many types of batch and continuous internal mixers, such as planetary mixers, dual arm sigma type mixers, and extruders, are suitable to prepare the formulation. In some embodiments, the mixture can be prepared in a relatively low shear mixer such as a planetary mixer at ambient temperature.

To prepare the formulation, fiber (typically cut into strips from sheet stock) and about 40% of the total filler were taken with about 30-40% of the total water in a planetary mixer and mixed for about 5 minutes to the consistency of coarse eraser crumbs. The pre-gel starch was added and mixing was continued for about 6-9 minutes to further disaggregate the fiber. The remaining ingredients were added to the mixer and mixed for about 2-3 minutes until the mixture appeared to be free of dry lumps. The required mixing time will vary with scale and speed of mixing.

To form an article, a heated mold apparatus having a cavity in the shape of a desired final product was used to form small trays. In this process, the mold apparatus has gap or gaps for venting vapor produced during heating or baking. A mixture that is liquid or semi-liquid is added to the cavity of the mold apparatus, the apparatus is closed, and vapor or steam is produced within the mixture during as it heats. In this embodiment, the volume of mix introduced into the mold cavity is substantially less than the cavity volume, but the mixture expands with the development of internal vapor or steam pressure during heating until it completely fills the cavity. In this embodiment, the ratio of the volume of liquid or semi-liquid material that is put into the mold to the volume of the mold cavity is between 1:4 and 1:2.5, or, alternatively, between 1:3.7 and 1:3.1. Upon sufficient contact of the mixture to the heated mold apparatus, a skin forms on the outer surface of the mixture. The skin is permeable or semi-permeable to the vapor or steam and the combination of the skin and the gap allows escape of steam or vapor from the cavity to the exterior of the mold apparatus. The escape of steam or vapor is accomplished without the escape of any significant amount of the mixture. A significant amount of escape of the mixture would result in a waste of raw materials, and a waste of energy needed to heat the additional escaping materials, as well as require additional processes to remove excess material and any material clogging the vent gaps The vapor escapes while the mixture is retained in the cavity because the gap is of sufficient size, for example, small enough that the skin formed on the surface of the mixture from contact of the mixture with the heated mold surface, when under sufficient pressure from the steam or vapor produced during heating the mixture, allows the steam or vapor to escape through the skin and the gap to the exterior of the mold apparatus without rupturing the skin. Because the skin is not permeable to the mixture, which may still be liquid or semi-liquid prior to the completion of heating, the mixture cannot escape from the cavity of the mold apparatus.

The heating or baking temperature and time will vary depending upon the specific mixture and can be readily selected with little experimentation by one skilled in the art. An example of a mold that can be used in this example is taught in U.S. Published Application No. 20040265453, which is hereby incorporated herein by reference in its entirety.

A typical mold temperature will be in the range of 160-240° C. and, in some embodiments, in the range of about 180-220° C. The heating or bake time depends greatly on the size and thickness of the article and typical articles range from about 40 seconds to 450 seconds, from about 40 seconds to about 80 seconds, from about 50 seconds to about 300 seconds, from about 60 seconds to about 250 seconds, from about 70 seconds to about 150 seconds, or any range therein. In some embodiments, the material has to be baked down to very low water content (probably less than about 2%) before opening the mold—otherwise the article will burst. In some embodiments, additives that increase the strength of the material allow for shorter minimum bake times because the inherently stronger material can tolerate more internal steam pressure.

Example 3

Articles are Biodegradable and Compostable

The biodegradation and compostability was tested on a sample of articles produced using the biodegradable, starch-based, compositions described in this application. These samples did not contain PVA, VAE, EVA, epoxidized vegetable oil, or hydrogenated triglycerides, as taught in some embodiments, but one of skill will appreciate that these additives will not affect the biodegradability or compostability of the compositions. Concentrations for all components were within the ranges described in Table 1, above, except that 0.5% of the mixture consisted of a set of additives not listed in Table 1. (About 90% of this additive set consisted of natural materials—proteins and other natural polymers—that are considered intrinsically biodegradable due to their origin. One of skill in the art will recognize that addition of trace amounts of natural materials to a composition such as that described in Table 1 will not materially affect the measured biodegradability or compostability of that composition.)

The compositions were exposed to Aerobic Composting (Biodegradation) per ASTM D-5338 @ 58±3° C. through contact with compost medium. The results were compared to the biodegradation rate of a positive control of cellulose.

Sample Identification:
A. 9P006-U (Avg)
C. Positive Cellulose Control (Avg)

The Aerobic Biodegradation per ASTM D 5338 @ 58±3° C. of the test samples yielded the following based on (%) carbon conversion in Table 2:

TABLE 2

| Sample: | Description: | Carbon Conversion (%) Based on $CO_2$ Production |
| --- | --- | --- |
| A | 9P006-U (Avg) | 79.26 |
| C | Positive cellulose control (Avg.) | 98.37 |

The % weight loss was as follows in Table 3:

TABLE 3

| Sample: | Description: | % Weight Loss |
| --- | --- | --- |
| A | 9P006-U (Avg) | 100.00 |
| C | Positive cellulose control (Avg.) | 100.00 |

Based on the overall weight loss and carbon conversion of the samples and the cellulose control tested per ASTM D 5338 and D 6400, Sample A would be considered to be compostable.

The evaluation of the samples was run per ASTM D-5338 at 58±3° C. per the Tier Two Level testing per ASTM D 6400. Samples ranging in weight from 0.6000-0.6300 grams were placed into 150 grams of composting material. The composting medium had a Carbon:Nitrogen ratio of 31:1 which was within the specifications for this test. Samples had degraded into compost after 65 days and could not be distinguished from or detected in the compost biomass material. The difference in the weight loss data and the carbon dioxide generation for the-samples indicates that physical disintegration occurred as the material composted.

The cellulose control had total degradation. The carbon conversion (%) for the cellulose was normal for this test and also confirmed a viable, active compost mixture. The amount of carbon from sample A converted to $CO_2$ during the test was for 79.26% of the total carbon present in the sample.

The efficiency of $CO_2$ produced compared to the maximum theoretically calculated $CO_2$ which should have been produced was 79.26% for sample A since all of the sample had degraded.

Based on the overall weight loss and carbon conversion, these materials would be considered to have excellent compostability/biodegradability. Per ASTM D 5338 and D 6400 fully compostable materials need to exceed 60% weight loss during the test (which the samples did achieve) and have a total carbon available converted to $CO_2$ percentage greater than 60% (which the samples did achieve) to be considered totally compostable materials.

In the examples set forth below, the one or more additive components in the samples may be present in an amount ranging from more than 0% to about 15%. In certain embodiments of the samples, the additive components may be present in an amount ranging from about 0.5% to about 10%. In certain embodiments of the samples, the additive components may be present in an amount ranging from about 1.5% to about 7%. In certain embodiments of the samples, the additive components may be present in an amount ranging from about 2% to about 5%. Specific samples, including amounts of the additive components falling with the above described ranges, are shown below. Unless otherwise indicated, all percent amounts for the various components shown below refer to the percent on a dry weight basis.

Example 4

Additives Improve the Density and Water Resistance of Articles

Several additives have been found that improve the toughness of the formulation and improve the moisture resistance. The addition of poly(vinyl acetate) (PVAc) and/or poly(vinyl acetate-ethylene) (VAE) emulsions to the biodegradable, starch-based compositions improves the moisture resistance of the formulation, as measured by the Cobb value (g/m2). The Cobb value is a standard paper industry test method (ASTM D 3285) to determine the moisture resistance of sized paper and paperboard. The test method involves determined the quantity of water absorbed (weight gain of the sample in gm) by a fixed surface area (m2), in a specific time. Standard conditions employ a metal ring with an internal diameter of 11.28 cm (cross-sectional or surface area of 100 cm2) clamped onto the sample to contain 100 ml of water and a water contact time of 2 minutes. After contact, the water is drained from the metal ring and excess water is blotted from the sample with blotting paper. To control the amount of blotting, a 10 kg metal roller is rolled twice over the blotting paper, which is on top of the sample. Variations possible with the method include using different diameter rings for smaller samples (25 or 10 cm² surface area, with a corresponding reduction in the amount of water employed), use of shorter (1 minute) or longer (18 hours) contact times, and use of other test liquids. Conditioning of the samples and blotting paper to 50% RH at 23° C. (ASTM D685) is utilized for the Cobb test. Besides moisture resistance, the PVAc and VAE additives have also been found to maintain or improve other important physical properties, such as tensile strength, modulus and impact.

It has also been found that the addition of epoxidized vegetable oil, such as epoxidized linseed oil (ELO) and epoxidized soybean oil (ESO), to the biodegradable, starch-based compositions allows for a broader density range of articles to be manufactured in the heated mold described above. Surprisingly, the manufacture of denser articles does not require a longer bake time when epoxidized oils are used. Denser articles are stronger and may be more economical to produce than thicker articles, which require longer bake times.

Table 4 shows that with a composition comprising 15% bamboo fiber, a given tray mold with a volume of 59.8 cc showed a maximum fill weight of 36 g of batter (at 40% solids) and had a minimum bake time of 65 seconds. The 15% "standard" fiber samples in Table 4 also contained 4% magnesium stearate (MgSt) and 2% carnauba wax unless otherwise noted. The 29% "high" fiber samples in Table 4 contained 3.5% MgSt and 3% carnauba wax. All samples were molded at a nominal thickness of 80 mil unless otherwise indicated.

TABLE 4

| Sample | Max. Fill weight (g) | Min. Bake Time (sec) | Production fill weight (g) | Cobb Value[†] (g/m²) |
|---|---|---|---|---|
| 141030 15% Fiber control | 36 | 65 | 34 | 65.6 |
| 141032 Std. fiber + 5% PVAc1 | 36 | 60 | 34 | 56.7 |
| 141051 Std. fiber + 2% ELO1 | 42 | 65 | 34 | 67.9 |
| 141159 Std. fiber + 3% MgSt + 1.5% ELO1 | 40 | 73 | 39 | 70.7 |
| 141172 Std. fiber + 3% MgSt + 1.5 ELO1 at 105 mils thick | 50 | 145 | 48 | 70.7 |
| 141102 29% Fiber control | 48 | 68 | 46 | 54.7 |
| 141069 High fiber + 5% PVAc2 | 48 | 65 | 44 | 46.7 |
| 141074 High fiber + 5% VAE5 | 49 | 70 | 48 | 49.3 |
| 141098 High fiber + 5% PVAc2 + 2% ELO1 | 50 | 73 | 48 | 62.7 |
| 141100 High fiber + 5% PVAc2 + 2% ESO1 | 54 | 65 | 48 | 50.7 |
| 141096 High fiber + 5% PVAc1 + 2% Corn Oil | 55 | 65 | 48 | 50.7 |
| 141081 High Fiber + 5% VAE5 + 2% ELO1 | 54 | 65 | 48 | 50.7 |

| Legend: | | | |
|---|---|---|---|
| Code | Composition | Trade name | Supplier |
| PVAc1 | Poly(vinyl acetate) | Vinac 21 | Air Products |
| ESO1 | Epoxidized soybean oil | BioFlex ESBO | Blackman Uhler Chemical |
| ELO1 | Epoxidized linseed oil | BioFlex ELO | Blackman Uhler Chemical |
| VAE5 | Poly(vinyl acetate-ethylene) | Airflex 100HS | Air Products |
| PVAc2 | Poly(vinyl acetate) | Vinac 828M | Air Products |
| VAE7 | Poly(vinyl acetate-ethylene) | Airflex 1082 | Air Products |
| Corn Oil | Corn oil | | Mazola |

[†]Cobb Value measured after 2 minutes

For example, the data shows that the addition of 5% of PVAc1 to the 15% Fiber control composition results in a shorter bake time and significantly less water uptake (lower Cobb value). The addition of 2% ELO1 allows for significantly denser articles to be manufactured (42 vs. 36 g maximum mold fill) without increasing the bake time. Reducing the MgSt content from 4 to 3% reduces the density or maximum fill and increases the bake time and Cobb value. Increasing the mold thickness allows more material to be added to the mold (maximum fill and production weight) but significantly increases bake time and does not help water resistance.

Increasing the fiber content from 15% to 29% results in denser articles. The further addition of PVAc or VAE improves the moisture resistance. The addition of ELO or ESO also increases the density of articles that can be manufactured. The addition of corn oil also allows for denser articles to be made, but significant quantities of oil were observed blowing out of the steam vents in the mold. This would ultimately lead to clogging and down time in manufacturing to clean the molds. Clearly, the epoxidized oils are more compatible with the starch matrix.

These additives improve the moisture resistance of the compositions, allow higher density parts to be manufactured, and do not increase the bake time. These improvements to the moisture resistance and physical properties (via increased part density) are made without adversely affecting the manufacturing cycle time or compromising the biodegradability of the products.

Example 5

Additives Improve the Moisture Resistance of Articles

Several additives have been found that improve the moisture resistance of the compositions. Waxes can be used to improve the moisture resistance and aid in mold release. The wax used is preferably biodegradable, compostable, and natural. Carnauba wax, for example, works well but is quite expensive, and its use is limited to no more than about 3% because it steam distills out, plugging the mold vents. It was found that hydrogenated vegetable oils having a melting point between about 54° C. and 85° C. can be used in place of carnauba wax and improve the moisture resistance of the formulation as measured by Cobb value. Suitable hydrogenated vegetable oils are available from EvCo Research under the trade names EVCOPEL EVCORR™ and EVCOPEL EVCEAL™. Further, at levels of up to 3% on a dry weight basis essentially no material builds up in the mold vents of a molding apparatus. The hydrogenated vegetable oil can be dispersed in the formulation in the form of powder, incorporated as a melt (with or without surfactants) or preferably as an emulsion.

A composition with 15% bamboo fiber, 4% MgSt, and 2% carnauba wax has a 2-minute Cobb value of around 65-66 g/m² as shown in Table 5. Carnauba wax and MgSt are expensive components so it is desirable to limit their use. However, when the MgSt content is lowered to 3%, with 2% carnauba wax still in the formulation, the 2-minute Cobb value increases to about 70-71 g/m². A 15% bamboo fiber sample with no MgSt and 3% carnauba wax had a 2-minute Cobb value of 88 g/m². A 15% bamboo fiber sample with no MgSt and 3% hydrogenated castor oil (no carnauba wax) had a 2-minute Cobb value of about 94-95 g/m².

TABLE 5

| Sample | Max. Fill weight (g) | Min. Bake Time (sec) | Production fill weight (g) | Cobb Value (g/m²) |
|---|---|---|---|---|
| 141030 15% Fiber, 4% MgSt, 2% Carnauba - control | 36 | 65 | 34 | 65.6 |
| 141159 15% Fiber, 3% MgSt + 1.5% ELO1 | 40 | 73 | 39 | 70.7 |
| 141120 15% Fiber, 0% MgSt + 1.5% ESO1 + 3% carnauba wax | 45 | 63 | 44 | 88.0 |
| 141139 15% Fiber, 0% MgSt + 3% Cast + 1.5% ELO1 | 36 | 58 | 36 | 94.7 |
| 141174 15% Fiber, 3% MgSt + 1.5% ELO1 + 2% EvCo1 | 40 | 73 | 38 | 65.3 |
| 141178 15% Fiber, 3% MgSt + 2% EvCo1 | 36 | 65 | 35 | 58.7 |
| 141182 15% Fiber, 3% MgSt + 2% Emul01 | 37 | 68 | 36 | 57.3 |
| 141187 15% Fiber, 3% MgSt + 2% Emul02 | 38 | 70 | 37 | 60.0 |
| 141192 29% Fiber, 3.5% MgSt + 2% Emul03 | 44 | 63 | 42 | 48.0 |
| 141197 29% Fiber, 3.5% MgSt + 3% Emul04 | 44 | 73 | 43 | 44.0 |
| 150803 15% Fiber, 3% MgSt + 3% Emul05 | 41 | 73 | 40 | 57.3 |
| 150805 29% Fiber, 3.5% MgSt + 5% PVAc2 + 3% Emul05 | 43 | 60 | 40 | 41.3 |

Legend: (See also Legend in Example 4)

| Code | Composition | Trade name | Supplier |
|---|---|---|---|
| Cast | Hydrogenated Castor oil | Castor Wax MP80 | Vertellus |
| EvCo1 | Hydrogenated veg. oil | EVCOPEL EVCEAL ™ | EvCo Research LLC |
| Emul01 | Emulsion of Hydrogenated veg. oil | Emulsion of EVCOPEL EVCEAL ™ | EvCo Research LLC |
| Emul02 | Emulsion of Hydrogenated veg. oil | Emulsion of EVCOPEL EVCORR ™ | EvCo Research LLC |
| Emul03 | Lower solids emulsion of Hydrogenated veg. oil | Emulsion of EVCOPEL EVCORR ™ | EvCo Research LLC |
| Emul04 | Emulsion of Hydrogenated veg. oil | Emulsion of EVCOPEL EVCEAL ™ | EvCo Research LLC |
| Emul05 | Emulsion of Hydrogenated veg. Oil With ELO1 | Emulsion of EVCOPEL EVCEAL ™ And BioFlex ELO | EvCo Research LLC And Blackman Uhler Chemical |

The remaining data in Table 5 show that replacing carnauba wax with EvCorr or EvCeal results in significantly less water uptake (lower Cobb value) even at lower levels of MgSt. Further improvements are seen utilizing the hydrogenated vegetable oils as emulsions having some dependence on the surfactant and solids content of the emulsion. Utilizing the oils as emulsions allows for the easy incorporation of additional hydrophobic ingredients, such as the epoxidized vegetable oils, rosin, etc. Addition of PVAc or VAE further improves the moisture resistance, and the moisture resistance is improved while maintaining or improving other physical properties. Moreover, these additives improve the moisture resistance without adversely affecting the bake time, or manufacturing cycle time, or compromising the biodegradability. They are significantly more economical to use than carnauba wax and appear to cause much less fouling of the mold vents in a molding apparatus.

Example 6

Additives Improve the Strength of Articles

Flexural modulus was determined using a 3-point bend test on a DMA instrument. Essentially the specimen is supported at either end and pressed in the center with a load cell. Force versus displacement is monitored until the test specimen breaks. The rate is slow, unlike an impact test. The method is detailed in ASTM references D 790, D 5023 and D 5934. The 3-point bend data can be used to calculate how much energy or work is required to break the test specimen using the following equation:

Force (at break)×Displacement (at break)=Work (or Energy to break).

Test specimens were equilibrated to 0%, 20%, 50%, or 80% RH for at least 24 hrs. prior to the 3-point bend testing as indicated.

High speed impact testing was done using a Dynatup instrument which has a falling "tup" with a hemispherical tip. This test method can be found in ASTM D 3763. The tup speed in these tests was about 12 ft./sec. Tensile and elongation were measured on an Instron materials testing machine. High speed impact testing, tensile and elongation were determined on samples equilibrated to 50% RH.

TABLE 6

| Sample | 3-point bend Flexural Modulus @ Yield (Mpa) | T&E Tensile (PSI) | T&E Elongation (%) | Dynatup Impact Data Max Load (lb.) | Dynatup Impact Data Max Deflection (in.) | Dynatup Impact Data Total Energy (ft · lbf) |
|---|---|---|---|---|---|---|
| 141030 15% fiber Control | 703 | 265 | 1.2 | 7.15 | 0.211 | 0.159 |
| 141032 15% fiber + 5% PVAc1 | 626 | — | — | — | — | — |
| 141102 29% fiber Control | 883 | 597 | 1.8 | 12.69 | 0.252 | 0.309 |
| 141028 29% fiber + 5% PVAc1 | 1273 | 489 | 1.5 | 11.96 | 0.197 | 0.238 |
| 141069 29% fiber + 5% PVAc2 | 1121 | 570 | 1.6 | 12.52 | 0.209 | 0.282 |
| 141047 29% fiber + 5% PVAc1 + 1.1% ELO1 | 1168 | 564 | 1.5 | 14.04 | 0.214 | 0.292 |
| 141049 29% fiber + 5% PVAc1 + 2.0% ELO1 | 1058 | 571 | 1.7 | 13.8 | 0.219 | 0.319 |
| 141074 29% fiber + 5% VAE5 | 870 | 646 | 1.9 | 13.19 | 0.214 | 0.296 |
| 141076 29% fiber + 5% VAE7 | 1151 | 533 | 1.8 | 12.98 | 0.181 | 0.263 |

The data in Table 6 is physical property data taken at 50% RH and shows that at 29% fiber, PVAc and VAE improve the high speed impact properties and increase the modulus with little affect on the tensile or elongation. The data also shows that the addition of ELO1 provides some further increase in the impact strength.

TABLE 7

| | Energy to Break (mJ) | | |
|---|---|---|---|
| Sample | 20% RH | 50% RH | 80% RH |
| 141030 15% Fiber Control | 27.3 | 50.2 | 50.1 |
| 141159 15% Fiber + 1.5% ELO1 | 56.8 | 49.0 | 46.4 |
| 141089 15% fiber + PVAc2 | 26.7 | 42.5 | 51.7 |
| 141102 29% fiber control | 73.6 | 83.4 | 130.0 |
| 141069 29% Fiber + 5% PVAc2 | 65.4 | 70.8 | 93.1 |
| 141044 29% Fiber + VAE2 | 70.5 | 64.0 | 116.8 |
| 141074 29% Fiber + 5% VAE5 | 68.4 | 74.1 | 118.1 |
| 141076 29% Fiber + 5% VAE7 | 62.9 | 69.0 | 119.6 |
| 141100 29% fiber + 5% PVAc2 + 2% ESO1 | 69.1 | 63.1 | 93.0 |
| 141098 29% fiber + 5% PVAc2 + 2% ELO1 | 64.5 | 66.9 | 88.9 |

Table 7 describes the "energy to break" at various RH. The data in Table 7 show that the addition of ELO to the 15% fiber formulation significantly increases the energy required to break the material. PVAc and VAE, which improve the moisture resistance, do not negatively impact the energy to break.

TABLE 8

| Sample | Modulus @ Yield | Modulus @ Break | Energy to break (mJ) |
|---|---|---|---|
| 141159 15% fiber + 1.5% ELO1 | 725 | 676 | 10.66 |
| 141182 15% fiber + 2% Emul01 | 512 | 403 | 7.1 |
| 141069 29% fiber + 5% PVAc2 | 1256 | 951 | 21.07 |
| 141197 29% fiber + 3% Emul04 | 1421 | 717 | 13.1 |

Table 8 shows the energy to break for trays after additional baking. The data in Table 8 are for trays that were baked at 193° C. for 40 minutes and then stored in a desiccator to determine which formulations were the least brittle in a bakery application. With the 15% fiber formulation it can be seen that ELO increases the energy to break and would be less brittle. With the 29% fiber formulation it can be seen that PVAc increases the energy at break indicating that these formulations would be less brittle in a bakery application.

While a number of exemplary aspects and embodiments have been discussed above, those of skill will recognize that certain modifications, permutations, additions and sub combinations are possible in light of the teachings herein. One of skill will also appreciate that the teachings provided, therefore, are illustrating general concepts, and will be mindful that there are several variations possible. It is intended that the following claims are to be interpreted in light of the full scope of the possibilities represented by the claims, the associated teachings provided in support of the claims, and the knowledge possessed by one skilled in the art.

We claim:

1. A composition comprising
   a biodegradable fiber component in an amount ranging from about 5% to about 40% on a dry weight basis;
   a starch component in an amount ranging from about 40% to about 94.5% on a dry weight basis; and,
   an additive component in an amount ranging from more than 3% to about 15% on a dry weight basis, wherein the additive component comprises 3% magnesium stearate, and a hydrogenated triglyceride;
   wherein the composition is mixed to allow for shaping of the composition into a form that creates a biodegradable, disposable, and water-resistant article of manufacture when heated at a sufficient temperature and for a sufficient time.

2. The composition of claim 1, wherein the biodegradable fiber component comprises a natural fiber, and the natural fiber comprises a woody fiber, a non-woody fiber, or an animal fiber.

3. The composition of claim 1, wherein the biodegradable fiber component comprises a biodegradable synthetic fiber.

4. The composition of claim 1, wherein the starch component comprises an organic filler material having a ratio of starch to filler that ranges from about 10:1 to about 1:1.

5. The composition of claim 4, wherein the ratio of starch to filler is about 3:1.

6. The composition of claim 1, wherein the additive is present in an amount ranging from about 3% to about 5%.

7. The composition of claim 1, wherein the additive component is a hydrogenated triglyceride with a melting point of about 54 to 85° C.

8. The composition of claim 1, wherein the additive component further comprises an epoxidized vegetable oil.

9. The composition of claim 1, wherein the additive component further comprises a polymer selected from the group consisting of poly(vinyl acetate), poly(vinyl acetate-ethylene) copolymer, and poly(ethylene-vinyl acetate) copolymer.

10. An aqueous mixture comprising the composition of claim 1, wherein the mixture contains water in a quantity sufficient to allow for shaping of the composition into a form that creates a biodegradable, disposable, and water-resistant article of manufacture when heated at a sufficient temperature and for a sufficient time.

11. The aqueous mixture of claim 10 comprising from about 40% to about 80% water.

12. The aqueous mixture of claim 10, wherein the starch component comprises a combination of native starch and pre-gelatinized starch, and the ratio of the fiber to pre-gelatinized starch ranges from about 1.5:1 to about 3:1.

13. The aqueous mixture of claim 11 further comprising a wax, a cross-linking agent, or a combination thereof.

14. A method of creating a biodegradable, starch-based, water-resistant article of manufacture, wherein the method comprises:
    adding the mixture of claim 13 to a mold apparatus having a cavity; and
    heating the mixture in the mold apparatus at a sufficient temperature and for a sufficient time for the mixture to be a stable form having a skin formed on the outer surface of the mixture where the mixture contacts the surface of the cavity during the heating;
    wherein, the mold apparatus comprises at least one gap such that vapor can exit the cavity of the mold though the gap without substantial loss of the mixture through the gap;
    and wherein the material fills the mold cavity by in situ expansion during heating.

15. An article of manufacture comprising the composition of claim 1, wherein the article of manufacture is biodegradable and water-resistant.

16. The article of manufacture of claim 15, wherein the article of manufacture is compostable.

17. The article of manufacture of claim 15, wherein the article of manufacture is a food service product, a packaging material, or a combination thereof.

18. The article of manufacture of claim 15, wherein the article of manufacture is a food product that is edible.

19. The article of manufacture of claim 15, wherein the additive component is a hydrogenated triglyceride with a melting point of about 54 to 85° C.

20. The article of manufacture of claim 15, wherein the additive component further comprises an epoxidized vegetable oil.

21. The article of manufacture of claim 15, wherein the additive component further comprises a polymer selected from the group consisting of poly(vinyl acetate), poly(vinyl acetate-ethylene) copolymer, and poly(ethylene-vinyl acetate) copolymer.

22. A method of creating a biodegradable, starch-based, water-resistant article of manufacture, wherein the method comprises:
    preparing a mixture of a biodegradable fiber component and a starch component, wherein the biodegradable fiber component is in an amount ranging from about 5% to about 40% on a dry weight basis, and the starch component is in an amount ranging from about 40% to about 94.5% on a dry weight basis;
    adding an additive component to the mixture in an amount ranging from more than 3% to about 15% on a dry weight basis, wherein the additive component comprises 3% magnesium stearate, and a hydrogenated triglyceride;
    adding an aqueous component to the mixture to create an aqueous composition, wherein the aqueous component comprises water in a quantity sufficient to allow for shaping of the composition into a desired form; and,
    heating the desired form at a sufficient temperature and for a sufficient time to create a biodegradable, disposable, and water-resistant article of manufacture from the composition.

23. The method of claim 22, wherein the article of manufacture is compostable.

24. The method of claim 22, wherein the article of manufacture is a food service product, a packaging material, or a combination thereof.

25. The method of claim 22, wherein the article of manufacture is an approved food product that is edible.

26. The method of claim 22, wherein the biodegradable fiber component comprises a natural fiber, and the natural fiber comprises a woody fiber, a non-woody fiber, or an animal fiber.

27. The method of claim 22, wherein the biodegradable fiber component comprises a biodegradable synthetic fiber.

28. The method of claim 22, wherein the starch component comprises an organic filler material having a ratio of starch to filler that ranges from about 10:1 to about 1:1.

29. The method of claim 28, wherein the ratio of starch to filler is about 3:1.

30. The method of claim 22, wherein the additive component is present in an amount ranging from about 3% to about 5%.

31. The method of claim 22, wherein the starch component comprises a combination of native starch and pre-gelatinized starch, and the ratio of the fiber to pre-gelatinized starch ranges from about 1.5:1 to about 3:1.

32. The method of claim 22, further comprising a wax, a cross-linking agent, or a combination thereof.

33. The method of claim 22, wherein the additive component is a hydrogenated triglyceride with a melting point of about 54 to 85° C.

34. The method of claim 22, wherein the additive component further comprises an epoxidized vegetable oil.

35. The method of claim 22, wherein the additive component further comprises a polymer selected from the group consisting of poly(vinyl acetate), poly(vinyl acetate-ethylene) copolymer, and poly(ethylene-vinyl acetate) copolymer.

36. A method of creating a biodegradable, starch-based, water-resistant article of manufacture having an improved strength, wherein the method comprises:
    preparing a mixture comprising a biodegradable fiber component and a starch component, wherein the biodegradable fiber component is in an amount ranging from about 5% to about 40% on a dry weight basis, and the starch component is in an amount ranging from about 40% to about 94.5% on a dry weight basis;
    adding an additive component to the mixture in an amount ranging from more than 3% to about 15% on a dry weight basis, wherein the additive component comprises 3% magnesium stearate, and a hydrogenated triglyceride;
    adding an aqueous component to the mixture to create an aqueous composition, wherein the aqueous component comprises water in a quantity sufficient to allow for shaping of the composition into a desired form; and, heating the desired form at a sufficient temperature and for a sufficient time to create a biodegradable, disposable, and water-resistant article of manufacture from the composition.

37. The method of claim 36, wherein the article of manufacture is compostable.

38. The method of claim 36, wherein the article of manufacture is a food service product, a packaging material, or a combination thereof.

39. The method of claim 36, wherein the article of manufacture is a food product that is edible.

40. The method of claim 36, wherein the biodegradable fiber component comprises a natural fiber, and the natural fiber comprises a woody fiber, a non-woody fiber, or an animal fiber.

41. The method of claim 36, wherein the biodegradable fiber component comprises a biodegradable synthetic fiber.

42. The method of claim 36, wherein the starch component comprises an organic filler material having a ratio of starch to filler that ranges from about 10:1 to about 1:1.

43. The method of claim 42, wherein the ratio of starch to filler is about 3:1.

44. The method of claim 36, wherein the additive component is present in an amount ranging from about 3% to about 5%.

45. The method of claim 36, wherein the starch component comprises a combination of native starch and pre-gelatinized starch, and the ratio of the fiber to pre-gelatinized starch ranges from about 1.5:1 to about 3:1.

46. The method of claim 36, further comprising a wax, a cross-linking agent, or a combination thereof.

47. The method of claim 36, wherein the additive component is a hydrogenated triglyceride with a melting point of about 54 to 85° C.

48. The method of claim 36, wherein the additive component further comprises an epoxidized vegetable oil.

49. The method of claim 36, wherein the additive component further comprises a polymer selected from the group consisting of poly(vinyl acetate), poly(vinyl acetate-ethylene) copolymer, and poly(ethylene-vinyl acetate) copolymer.

50. The composition of claim 1, wherein at least a portion of the starch component can be comprised of one or more water-resistant starches.

51. The composition of claim 50, wherein the water-resistant starch component comprises a high-amylose starch.

52. The composition of claim 50, wherein the water-resistant starch component comprises alkenyl succinic anhydride modified starch, acetic anhydride modified starch, vinyl acetate modified starch, acrolein modified starch, epichlorohydrin modified starch, phosphorus oxychloride modified starch, sodium trimetaphosphate modified starch, or propylene oxide modified starch or a combination thereof.

53. The composition of claim 1, wherein the additive is present in an amount ranging from about 3% to about 7%.

* * * * *